Patented July 1, 1947

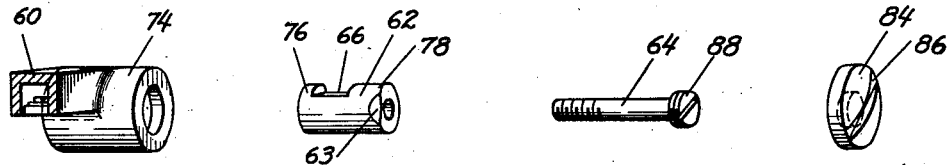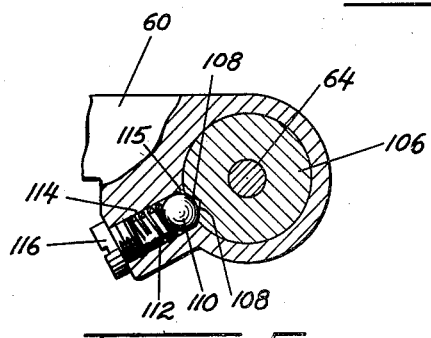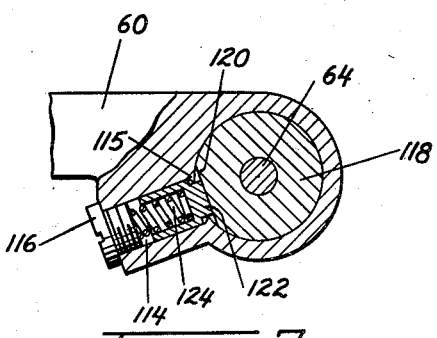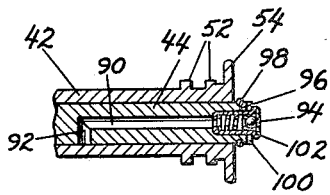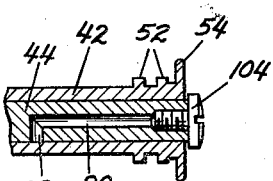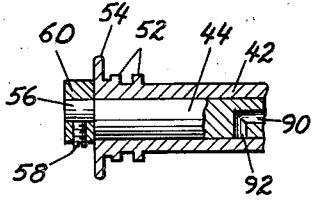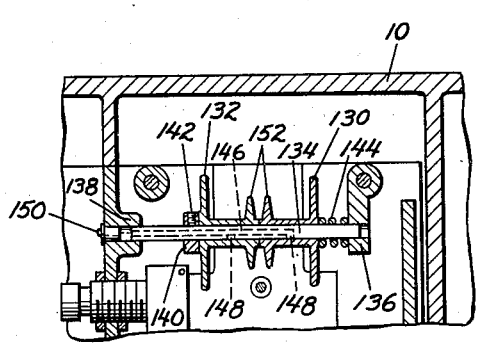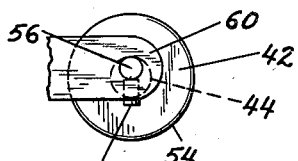

2,423,334

UNITED STATES PATENT OFFICE 2,423,334

GUIDE ROLLER ASSEMBLY FOR MOTION-PICTURE PROJECTORS

Raymond J. Miller, Detroit, Mich., assignor to American Pattern and Manufacturing Co., Detroit, Mich., a copartnership Application June 16, 1942, Serial No. 447,251

1 Claim. (Cl. 271—2.3)

This invention relates to motion picture projectors and more particularly to improved guide rollers for maintaining flexible strip film in driving engagement with the driving teeth of film moving sprockets to move the film through the motion picture projector.

Heretofore considerable difficulty has been experienced in maintaining the strip film in driving engagement with the film moving sprockets. This was particularly true after the projector had been used for a sufficient period of time to wear the guide rollers. These difficulties were in part due to the fact that no readily operable means were provided to vary the normal operating position of the guide rollers relative to the sprockets, and the fact that the guide rollers were themselves used as actuating levers to move their supporting brackets angularly to move the guide roller relative to the film driving sprockets. These forces exerted through the guide roller supporting shafts and arms subjected the units to undesirable strains which materially reduced their effective life and caused them to lose their adjustments in a relatively short period of time.

An object of this invention is to provide improved guide rollers for motion picture projectors wherein readily operable means are provided to accurately align the guide rollers with the film driving sprockets and to vary the force exerted by the guide roller to maintain the strip film in driving engagement with the film driving sprockets.

A further object of the invention resides in the provision of a cam member which may be detachably clamped in any angularly adjusted position with reference to a film driving sprocket to induce a guide roller carrying arm to maintain a desired adjusted position with reference to a driving sprocket to vary the force required to move the guide roller from an adjusted position with reference to the film driving sprocket.

Another object is to provide a guide roller assembly having an adjustable cam member which may be locked in any desired position to receive a guide roller carrying assembly which may be detachably mounted on the cam member without varying the adjusted position of the cam member.

A further object of this invention is to provide an eccentric adjustment between a guide roller supporting shaft and a guide roller carrying member whereby the position of the guide roller with reference to the film driving sprocket may be readily varied by merely manipulating the eccentric adjustment of the roller supporting shaft.

Another object is to provide a guide roller assembly having a separate manually operable lever to actuate the guide roller member between operative and inoperative positions, thereby minimizing the forces and strains to which the guide roller shaft is subjected.

Still a further object is to provide readily adjustable yielding means whereby the force exerted by a guide roller to yieldingly urge flexible strip film towards engagement with a driving sprocket may be readily varied.

Another object is to provide improved guide rollers having internally disposed means for oiling the guide rollers in such a manner that oil is prevented from contacting the surface of the film passing through the projector.

Yet a still further object of the invention resides in the provision of improved guide roller assemblies having hollow roller supporting shafts whereby lubricant may be supplied to the surfaces between the rollers and shafts intermediate the length of the rollers to lubricate the guide rollers over their full length and whereby any excess oil will be thrown off outside of the marginal edges of the film by centrifugal force exerted on radially extending flanges carried by the guide rollers.

Yet another object resides in the provision of a guide roller assembly which may be readily removed from a motion picture projector without disturbing the setting of an adjusting guide roller positioning cam adapted to be detachably clamped to a motion picture projector.

Another object of the invention resides in the provision of guide rollers adjustable relative to both the guide roller carrier arms and the film driving sprockets of motion picture projectors.

A further object is to provide a plurality of film guide rollers adjustable relative to each other and to a film driving sprocket.

Other objects and advantages of this invention will be apparent from the following detailed description considered in connection with the accompanying drawings, submitted for purposes of illustration only, and not intended to define the scope of the invention, reference being had for that purpose to the subjoined claim.

In the drawings wherein similar reference characters refer to similar parts throughout the several views:

Fig. 5 is an exploded view of a portion of the guide roller actuating mechanism.

Fig. 6 is a sectional view of a modified form of guide roller adjusting cam.

Fig. 7 is a view similar to Fig. 6 showing a still further modified form of adjusting cam.

Fig. 8 is a fragmentary longitudinal sectional view of a guide roller and shaft assembly showing one desirable means of lubricating the guide roller.

Fig. 9 is a view similar to Fig. 8 showing a modified form of lubricating means.

Fig. 10 is a fragmentary longitudinal sectional view of an eccentric connection between a guide roller supporting shaft and a guide roller supporting arm.

Fig. 11 is an end elevation of the device illustrated in Fig. 10.

Fig. 12 is a vertical sectional view illustrating film guide rollers positioned in the aperture plate.

Figures 1, 2, 3, 4:
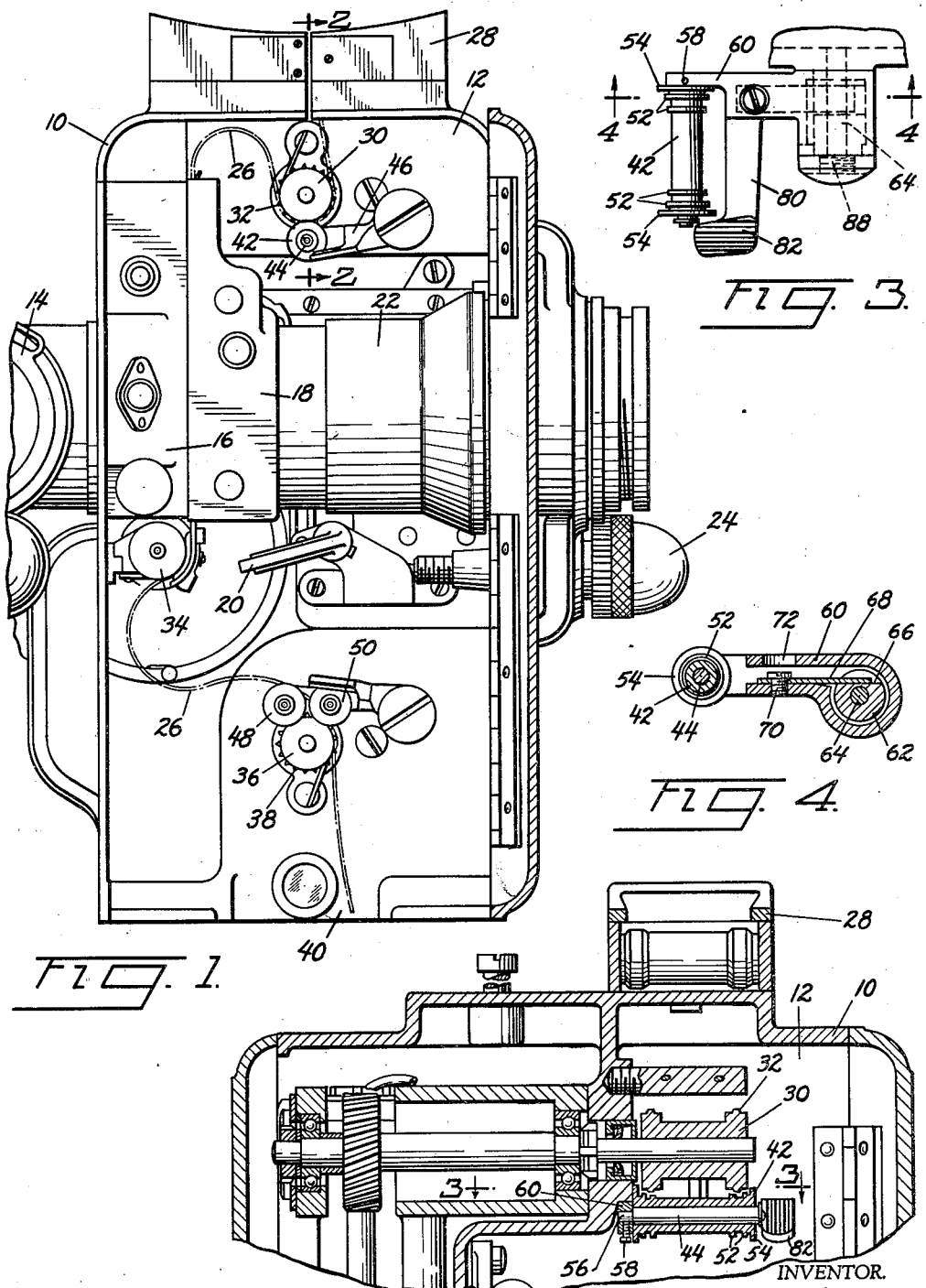
Fig. 1 is a side elevation partly in section of a motion picture projector embodying the present invention.
Fig. 2 is a vertical sectional view taken substantially on the line 2—2 of Fig. 1, looking in the direction of the arrows.
Fig. 3 is a plan view of a guide roller assembly taken substantially on the line 3—3 of Fig. 2, looking in the direction of the arrows.
Fig. 4 is a sectional view taken substantially on the line 4—4 of Fig. 3, looking in the direction of the arrows.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring now to Fig. 1, the invention is illustrated as applied to a motion picture projector having a main case 10 preferably separated by an intermediate wall 12 into a film compartment and a mechanism compartment. A light source positioned behind a shutter housing 14 is adapted to direct light through the housing 14 and a rear aperture pressure plate housing 16 having an aperture therein to project successively spaced images from flexible strip film aligned with an aperture in the housing 16 positioned in the film compartment.

The film is yieldingly maintained in engagement with the members forming the aperture by a pressure plate 18. The aperture pressure plate 18 may be moved axially with reference to the aperture in the pressure plate housing 16 by means of a manually operable lever 20 to facilitate the threading of film into the projector. The projected images are magnified by a lens positioned in a suitable lens tube assembly 22 and are projected onto a screen positioned forwardly of the projector in such a manner as to be viewed. The lens assembly may be moved longitudinally relative to the aperture in the housing 16 to focus the projected images by means of a manually operably lens focusing member 24 projecting through the forward case of the housing 10.

Strip film 26 may be drawn from a suitable film magazine carried by a magazine adapter 28 and passed over an upper film driving sprocket 30 having a plurality of sprocket driving teeth 32. The film 26 is directed downwardly between the aperture pressure plate 18 and the housing 16. An intermittently driven sprocket 34 is provided to intermittently move the film to align successively spaced film frames with the aperture positioned in the housing 16 to permit projecting light to project the images therefrom to the screen. After passing beyond the intermittently driven sprocket 34 the film is directed over a lower driving sprocket 36 having suitable driving teeth 38 and is directed through an opening 40 in the bottom of the housing 10 to a sound head preferably positioned below the film compartment.

The film 26 may be maintained in contact with the driving teeth 32 of the sprocket 30 by means of a guide roller 42 mounted on a shaft 44 carried by an arm 46 adjustably fastened to the intermediate wall 12. The film 26 may be maintained in contact with the driving teeth 38 of the lower driving sprocket 36 by means of a guide roller assembly having spaced guide rollers 48 and 50 similar to the guide roller 42 of the upper assembly. It will be understood that a single guide roller may be used to maintain the film in driving contact with the lower sprocket 36 if desired and a plurality of guide rollers 42 may be employed to maintain the film in contact with the upper driving sprocket 30.

Since the guide rollers 42, 48 and 50 are substantially identical, only the upper guiding roller will be described in detail. The roller 42 is provided with longitudinally spaced flanges 52 positioned to straddle the driving teeth 32 on each side of the driving rollers to maintain the apertures positioned adjacent the edges of the film 26 in contact with the driving teeth 32 of the driving sprocket 30. The guide roller 42 is also provided with enlarged flanges 54 positioned adjacent its ends to lie outside the marginal edges of the film whereby excess lubricating oil will be thrown radially by centrifugal force outside of the marginal edges of the film.

The guide roller shaft 44 is as illustrated in Figs. 2 and 10 provided with an eccentric projection 56 adapted to be adjustably clamped by a locking screw 58 in an arm 60. The position of the guide roller 42 and the flanges 52 relative to the driving sprocket 30 and driving teeth 32 may be varied by oscillating the shaft 44 on its eccentric adjustment to increase or decrease the clearance between the guide roller and the driving sprocket.

Where a plurality of guide rollers are employed to guide the film with reference to a single driving sprocket such as the guide rollers 48 and 50, each guide roller may be individually adjusted on its associated eccentric shaft to vary its position relative to the other guide roller and relative to the driving sprocket.

The arm 60 is as more clearly illustrated in Figs. 4 and 5 mounted on an adjustable cam member 62 adapted to be clamped to the intermediate wall 12 by a screw 64 having a threaded head. The cam member 62 has a flat surface 66 adapted to be engaged by a spring 68 positioned in the arm 60 and clamped thereto by means of a screw 70, an aperture 72 being provided in the upper portion of the arm 60 to permit access to the screw 70 in the arm 60 to secure it.

The arm 60 is preferably provided with a cylindrical portion 74 having longitudinally spaced concentric surfaces adapted to engage the surfaces 76 and 78 of the member 62 to journal the arm 60 relative to the cam member 62. The guide roller 42 may be actuated by means of a separate lever 80 having an actuating portion 82 positioned to lie outside of the guide roller 42 whereby it may be readily grasped to actuate the guide roller. A member 84 preferably having a screw driver slot 86 may be threaded on the threaded head 88 of the stud 64 to retain the outer end of the cylindrical portion 74.

As more clearly illustrated in Figs. 8 to 10, the shaft 44 is provided with an axially extending oiling duct 90 extending to approximately midway of the guide roller 42. The duct 90 communicates with a radially extending port 92 whereby oil may be applied to the inner surface of the roller 42 to lubricate the space between the roller 42 and shaft 44. Oil thus deposited flows axially in both directions to thoroughly lubricate the driving rollers and any excess oil is thrown off by the radially extending flanges 54 positioned outside of the marginal edges of the film 26.

As illustrated in Fig. 8, a ball check valve 94 yieldingly urged by a spring 96 may be provided to maintain lubricant within the port 90, the lubricant being supplied to the port 90 by depressing the ball 94. A snap ring 98 positioned in a groove adjacent the outer end of the shaft 44 may be provided to maintain the guide roller 42 on the shaft 44. A screw driver slot 100 may be provided to permit oscillation of the shaft 44 to adjust the eccentric projection 56 between the shaft 44 and the arm 60 to vary the spacing of the guide roller with reference to the driving sprocket. When it is desired to actuate the shaft 44 a pronged screw driver may engage the screw driver slot 100, or the ball and spring check valve may be countersunk to permit the use of a normal screw driver.

If desired, a screw 104 illustrated in Fig. 9 may be threaded into the outer end of the shaft 44 to maintain the guide roller 42 on the shaft and to maintain lubricant within the port 90.

The guide roller assembly may be removed for cleaning purposes without disturbing the adjustment of the cam member 62. To remove the assembly it is only necessary to take off the member 84 and rotate the arm 60 and cylindrical portion 74 to position the spring 68 in alignment with the radial surface of the member 82. The arm 60 may then be withdrawn from the camming member 62 for cleaning or repair and may be replaced thereon in the same manner without disturbing the spring tension urging the guide roller into engagement with the driving roller. A chamfered portion 63 may be provided to elevate the spring to facilitate assembling the arm 60 on the cam member 62.

Fig. 6 illustrates a modified form of camming member which may be used in lieu of that illustrated in Fig. 5. In this embodiment of the invention it will be noted that a camming member 106 having a V-shaped slot 108 positioned in one side is adapted to be detachably clamped to the intermediate wall 12 by means of the threaded stud 64. A ball 110 is urged by a spring 112 in a radially extending bore 114 into engagement with the slot 108 to yieldingly urge the guide roller 42 into a predetermined angular position with reference to the driving sprocket 30. The spring 112 is maintained in the bore 114 by means of a threaded plug 116 whereby the force urging the ball into engagement with the slot 108 may be varied to increase or decrease the yielding force urging the guide roller 42 toward the driving roller 30. The inner end of the bore 114 is contracted as illustrated at 115 to prevent the ball 110 from passing through.

The embodiment of Fig. 7 is similar in many respects to that of Fig. 6, it being noted that a camming member 118 is provided with a substantially flattened surface 120 adapted to be engaged by a plunger 122 yieldingly urged by a spring 124 into engagement therewith.

Referring now to Fig. 12, it will be observed that guide rollers 130 and 132 are positioned in the housing 16 and are mounted on a shaft 134 journalled at one end in an arm 136 and a boss 138. The roller 132 is maintained against axial movement by means of a stop 140 clamped to the shaft 134 by a stud 142. The guide roller 130 is yieldingly urged toward the guide roller 132 by means of a spring 144. An internal port 146 terminating in radially extending openings 148 is provided to lubricate the space between the guide rollers 130 and 132 and the shaft 134, a ball check oil cup 150 being provided to close the outer end of the boss 138 in which shaft 134 is journalled. Radially extending flanges 152 carried by the rollers 130 and 132 are provided to discharge oil that seeps through the joint between the rollers to prevent oil from travelling axially to get on the radially extended portions of the rollers 130 and 132 which engage the film.

This is a continuation-in-part of my co-pending application Serial No. 250,310, filed January 11, 1939, now Patent Number 2,312,663, issued March 2, 1943. Features disclosed but not claimed herein are being claimed in my copending application Serial Number 556,683, filed October 2, 1944.

I claim:

In a motion picture projector having a film-driving roller, a guide roller assembly comprising an arm having one end pivotally mounted in a predetermined space relationship to said film-driving roller, said arm being movable with respect thereto by application of manual forces, a shaft on the other end of said arm, a guide roller rotatably mounted on said shaft, eccentric adjustment means operatively interposed between said shaft and said arm for adjusting bearing of said guide roller in the operative position thereof against the film and the film-driving roller, a thumb lever provided on said arm intermediate its ends for manually moving said arm and the guide roller into and out of its operative position without exerting and transmitting the moving force through said eccentric adjustment means, said shaft being shaped to surround partly one end of the guide roller, but clearing the same in disassembly, and thus to interfere and discourage application of manual force directly to said guide roller; and yielding means adapted to maintain said guide roller in its operative position.

RAYMOND J. MILLER.

REFERENCES CITED

The following references are of record in the file of this patent:

UNITED STATES PATENTS

| Number | Name | Date |
| --- | --- | --- |
| 1,707,839 | Beck | Apr. 2, 1929 |
| 1,957,164 | Frappier et al. | May 1, 1934 |
| 1,986,180 | Bauch | Jan. 1, 1935 |
| 2,178,208 | Loomis et al. | Oct. 31, 1939 |
| 1,802,708 | Dina | Apr. 28, 1931 |
| 1,854,004 | Tschopp | Apr. 12, 1932 |
| 2,229,237 | Brenkert | Jan. 21, 1941 |
| 2,031,756 | Boecking | Feb. 25, 1936 |
| 2,164,748 | Loomis et al. | July 4, 1939 |